July 11, 1961 W. HARROWER 2,991,794
VALVE FOR FLUIDS HAVING ENTRAINED SOLIDS
Filed April 3, 1958
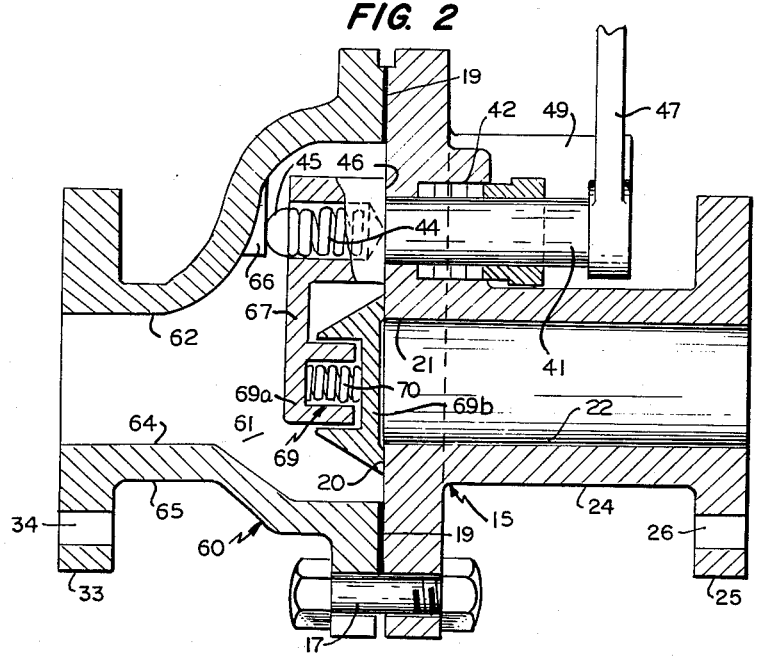
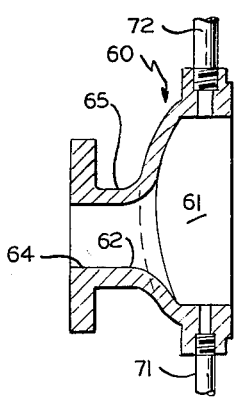
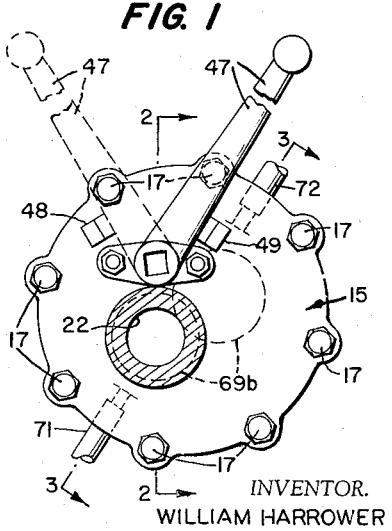
INVENTOR.
WILLIAM HARROWER
BY
Charles F. Chisholm
ATTORNEY

# United States Patent Office 2,991,794
Patented July 11, 1961

2,991,794
VALVE FOR FLUIDS HAVING ENTRAINED SOLIDS
William Harrower, Jersey City, N.J., assignor to Everlasting Valve Company, Jersey City, N.J., a corporation of New Jersey
Filed Apr. 3, 1958, Ser. No. 726,143
1 Claim. (Cl. 137—242)

This invention relates to valves for controlling the flow of fluids having solids entrained therein, flow-control including starting and stopping of the flow as well as varying the rate of flow.

In industry there are many fluids having solids entrained therein. Familiar examples are slurries and sludges. Fibrous materials, such as sugar-cane fibers, sugar-beet fibers, and asbestos, may be entrained in water or other liquids. Powdered, grannular, or fibrous materials may be entrained in liquids and, in dry form, may be entrained in gases.

Fluid suspensions of these and other types have been handled by flow procedure for many years, and difficulty has often developed at the valves used to control the flow. Under various circumstances and conditions, solids from the fluid suspension accumulate in the valve chamber and interfere with the movement of the flow-controlling member of the valve. Also, the solids may foul the valve seat and prevent proper closing of the valve. When the solids are of a fibrous nature, fouling of the valve seat is particularly likely to occur.

A general object of the present invention is the provision of a valve which is especially suited for the controlling of fluids having solids entrained therein, and which in large measure overcomes the foregoing difficulties.

Among other objects of the invention are the provision of a valve which greatly reduces the likelihood of solids accumulating therein, the provision of a valve which largely eliminates fouling of the valve seat even by fibrous materials, the provision of a valve which affords proper movement of the flow-controlling member even in the presence of a measure of accumulated solids, the provision of such a valve which may be readily purged, and the provision of such a valve which may be made with the use of various materials as desirable for withstanding either abrasive or corrosive action of the material passing through the valve.

Other objects and advantages, and objects and advantages relating to details of construction, manufacture, operation and use, will be apparent from the drawings and from the description hereinafter.

Where parts are, for clarity and convenience, referred to on the basis of their oriented position shown in the drawings, no limitation as to the positioning of the entire structure is to be implied. The entire structure may be installed in any oriented position that may be desired.

In both the description and the claims parts may at times be identified by specific names, for clarity and convenience. However, such nomenclature is to be understood as having the broadest meaning consistent with the context and the concept of my invention as distinguished from the pertinent prior art. The best mode in which I have contemplated carrying out my invention is herein disclosed, and is illustrated in the drawing which is to be considered as part of this specification.

FIG. 1 of the drawing is an end elevation of a valve embodying the invention, looking from the outlet end of the valve. The outlet throat of the valve is shown in section, and purge pipes are shown connected to the valve chamber.

FIG. 2 is a longitudinal section, on a larger scale, taken as indicated by the line 2—2 in FIG. 1.

FIG. 3 is a longitudinal section of the inlet-and-valve-chamber member of the valve of FIGS. 1 and 2, taken as indicated by the line 3—3 in FIG. 1.

The valve body shown consists of two halves or members, which I cast of suitable material, ordinarily iron or steel. For convenience, the member 15 will be referred to as the seat member and the member 60 will be referred to as the chamber member. These two members are bolted together face to face in conventional manner by a number of peripherally located bolts 17, eight of which are shown in FIG. 1. A gasket 19 is interposed between the confronting faces of the members 15 and 60, making a fluid-tight seal.

The seat member 15 of the valve body is provided with a smooth planar seat 20 which is ported at 21. The port 21 is the beginning of outlet passage 22 in outlet throat 24. The outlet throat 24 terminates in an annular flange 25, which is adapted to be bolted to the flanged end of an outlet pipe (not shown) with an interposed sealing gasket as is common in the art. To this end, flange 25 is provided with a suitable number of bolt holes, such as hole 26 in FIG. 2.

The chamber member 60 of the valve body has a valve chamber 61 which is ported at 62, this port being the terminal end of inlet passage 64 in inlet throat 65. The entrance end of inlet throat 65 is provided with an integral flange 33 for bolting to the flanged end of an inlet pipe (not shown), in the manner referred to in connection with the bolting of flange 25 to an outlet pipe. To this end, flange 33 is provided with a suitable number of bolt holes, such as hole 34 in FIG. 2.

Inlet passage 64 is in alignment with outlet passage 22 and the two passages have the same cross-sectional area. Thus, when the valve is open, free straight-line flow through the valve is afforded.

Cooperating with seat 20 is a gate designated as a whole by 69 that is on the end of a radially extending gate arm 67. The gate 69 includes a hollow member 69a which is integral with the arm 67 and which is loosely received within the central recess of disclike gate member 69b. A helical compression spring 70, which is interposed between the gate members 69a and 69b, presses the gate member 69b into sealing engagement with the smooth planar seat 20. Spring 70 exerts less force than spring 44 which will be referred to presently.

The gate arm 67 extends radially from and is integral with a shaft 41. This shaft extends through a fluid-tight stuffing gland 42, to the outside of the valve body. The inner end of the shaft 41 is recessed and receives a helical compression-spring 44. Attached to the inner end of the spring 44 is a bearing button 45, which bears against a boss 66 that is integral with the chamber member 60. Spring 44 exerts considerable force and biases the shaft 41 outwardly, holding annular shoulder 46 of the shaft firmly against the face of valve member 15.

Nonrotatably affixed to the outer end of the shaft 41 is a suitable handle 47 which may be oscillated between open and shut positions as is perhaps best seen in FIG. 1. Cast as integral parts of valve member 15 are stops 48 and 49 which project into the path of handle 47 and arrest it in open and shut positions, respectively.

In response to oscillation of the handle 47, the valve gate 69 is oscillated transversely of the seat-port 21, moving between open and shut positions. In open position (of the gate 69 and handle 47) the port 21 is completely uncovered and full flow through the valve is afforded. In closed position the port 21 is completely covered and flow through the valve is completely cut off. The gate 69 may, of course, be placed in intermediate positions to throttle flow through the valve as desired.

As the gate 69 is oscillated the fluid-and-entrained-solid within the valve chamber 61 is recirculated, i.e., fluid-and-entrained-solid is displaced by the leading edge of the gate with return flow to a position behind the trailing edge of the gate.

The recirculation of the fluid-and-entrained-solids during oscillation of the valve gate 69 inhibits the formation of "dead spots" in the valve chamber in which spots solids would accumulate and eventually interfere with opening and closing movement of the gate. Additionally, the periphery of the gate member 69b is annularly tapered as shown. Thus, there is provided between the gate and the wall of the valve chamber a space which is wedge-shaped in a plane disposed perpendicularly of the seat 20 and extending radially of the seat-port 21. The seat-remote end of this wedge-shaped space is the large end of the wedge. This arrangement eliminates corners in which solids might lodge. Also, it facilitates the recirculation of the fluid-and-entrained-solids as the gate is oscillated. Additionally, it facilitates purging of the valve chamber 27, which will now be explained.

As is seen in FIGS. 1 and 3, I arrange purge pipes 71 and 72 to communicate with the valve chamber 61. These pipes, which are provided with suitable valves (not shown), enable me to purge the valve chamber 61 from time to time with fluid under pressure, e.g., steam, water or compressed air.

In the valve I use means located externally of the valve chamber to so limit the movement of the gate that it will at all times be in spaced relation to the surrounding wall of the valve chamber—thereby (a) facilitating free flow of fluid-and-entrained-solid as it is recirculated in the valve chamber and (b) preventing oscillation of the gate from being interfered with by minor accumulations of fluid-and-entrained-solid. In the valve of FIGS. 1–3 such limitation upon the oscillation of the valve gate is imposed by the externally-located stops 48 and 49. In the case of a power-operated valve, such as a valve operated by an air-driven piston, I may utilize the limit of travel of the piston or other power-operated means to limit the oscillation of the gate and maintain it at all times in spaced relation to the wall of the valve chamber.

For particular purposes some or all of the valve body, the valve gate and the helical compression-springs may be made of brass, bronze, or stainless steel. For some very special uses the body and/or gate may be made of ceramic.

Where the valve is to be used for controlling fluids having fibrous materials entrained therein, e.g., bagasse, I make the cooperating surface of the gate and seat as hard surfaces with sharp corners. The corners then constitute cooperating shear edges which shear the fibrous material as the gate is moved to closed position.

I claim:

A valve for controlling the flow of fluids having solids entrained therein, said valve comprising: cooperating seat and gate, the seat being planar and having a port, the gate having a planar surface in sliding contact with the seat and having an annular surface extending away from the seat, said two surfaces of the gate intersecting each other at an acute angle and providing the gate with a sharp shearing edge to shear entrained fibrous material as the gate is closed; means extending from the seat and providing a ported valve chamber within which the gate is located; means for oscillating the gate transversely of the seat-port by movement of the gate toward and away from the wall of the valve chamber, such oscillation controlling the flow through the port and simultaneously forcing fluid and entrained solids toward the wall of the valve chamber; and means for limiting movement of the gate to maintain it in spaced relation to the wall of the chamber, the structure providing space for recirculation of the fluid and entrained solids within the chamber when the gate is oscillated whereby fluid and entrained solids are displaced by the leading edge of the gate with resultant flow thereof behind the trailing edge of the gate.

References Cited in the file of this patent

UNITED STATES PATENTS

| | | |
|---|---|---|
| 623,194 | Vollmann | Apr. 18, 1899 |
| 689,231 | Rolston | Dec. 17, 1901 |
| 863,004 | Smith | Aug. 13, 1907 |
| 876,625 | De Remer | Jan. 14, 1908 |
| 964,081 | Allbee | July 12, 1910 |
| 1,143,726 | Riegel | June 22, 1915 |
| 1,197,635 | Hunter | Sept. 12, 1916 |
| 1,314,559 | Wilson | Sept. 2, 1919 |
| 1,524,080 | Bordo | Jan. 27, 1925 |
| 2,273,720 | Morrow | Feb. 17, 1942 |
| 2,591,429 | Harrower | Apr. 1, 1952 |
| 2,720,370 | Williams | Oct. 11, 1955 |
| 2,824,715 | Williams | Feb. 25, 1958 |
| 2,851,051 | Englert | Sept. 9, 1958 |